United States Patent
Ohashi et al.

(10) Patent No.: US 7,940,180 B2
(45) Date of Patent: May 10, 2011

(54) RFID TAG, DEVICE FOR COMMUNICATING WITH A RFID TAG, SYSTEM FOR COMMUNICATING WITH A RFID TAG, AND APPARATUS FOR PRODUCING RFID TAG

(75) Inventors: Tsuyoshi Ohashi, Hashima (JP); Mitsuaki Koketsu, Nagoya (JP); Kunihiro Yasui, Nagoya (JP); Mika Matsushima, Inazawa (JP); Kazunari Taki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 303 days.

(21) Appl. No.: 11/856,707

(22) Filed: Sep. 17, 2007

(65) Prior Publication Data
US 2008/0074266 A1    Mar. 27, 2008

Related U.S. Application Data

(63) Continuation-in-part of application No. PCT/JP2006/305132, filed on Mar. 15, 2006.

(30) Foreign Application Priority Data

Mar. 17, 2005    (JP) .................................. 2005-077452

(51) Int. Cl.
*G08B 13/14*    (2006.01)
(52) U.S. Cl. ................. 340/572.1; 340/568.1; 340/10.1; 340/539.1; 340/825.69
(58) Field of Classification Search .... 340/572.1–572.9, 340/568.1, 573.1, 10.4, 10.1, 10.6, 10.3, 340/3.51, 825.72, 825.69, 3.6, 539.1
See application file for complete search history.

(56) References Cited

U.S. PATENT DOCUMENTS

| | | | |
|---|---|---|---|
| 6,201,474 B1* | 3/2001 | Brady et al. | 340/572.8 |
| 7,284,704 B2* | 10/2007 | Lubow | 235/462.01 |
| 7,549,591 B2* | 6/2009 | Lubow | 235/491 |
| 7,566,001 B2* | 7/2009 | Yamazaki | 235/380 |
| 7,586,397 B2* | 9/2009 | Bayley et al. | 340/10.4 |
| 2004/0047000 A1 | 3/2004 | Watanabe et al. | |
| 2004/0233040 A1* | 11/2004 | Lane et al. | 340/5.86 |
| 2008/0237344 A1* | 10/2008 | Masuta | 235/435 |

FOREIGN PATENT DOCUMENTS

JP    2000187715 A    7/2000
(Continued)

OTHER PUBLICATIONS

Japan Patent Office, Notice of Reasons for Rejection for Japanese Patent Application No. 2005-077452 (counterpart to above-captioned patent application), mailed Nov. 15, 2010.

*Primary Examiner* — Daniel Previl
(74) *Attorney, Agent, or Firm* — Baker Botts L.L.P.

(57) ABSTRACT

A projector has an antenna configured to transmit and receives information to and from a RFID circuit element including an IC circuit part configured to store and hold address information of an electronic file and device information about devices capable of executing a processing operation, and a projection control part and a control circuit configured to generate access information, transmit it to the RFID circuit element, acquire device information from its reply signal, and acquire file information based on the acquired device information.

3 Claims, 15 Drawing Sheets

FOREIGN PATENT DOCUMENTS

| | | |
|---|---|---|
| JP | 2002-120475 A | 4/2002 |
| JP | 2004-086708 A | 3/2004 |
| JP | 2004-330708 A | 11/2004 |
| JP | 2005-011161 A | 1/2005 |
| JP | 2005025240 A | 1/2005 |
| JP | 2005-049957 A | 2/2005 |
| JP | 2005059577 A | 3/2005 |
| WO | 2006098368 A1 | 9/2006 |

* cited by examiner

[FIG.1]
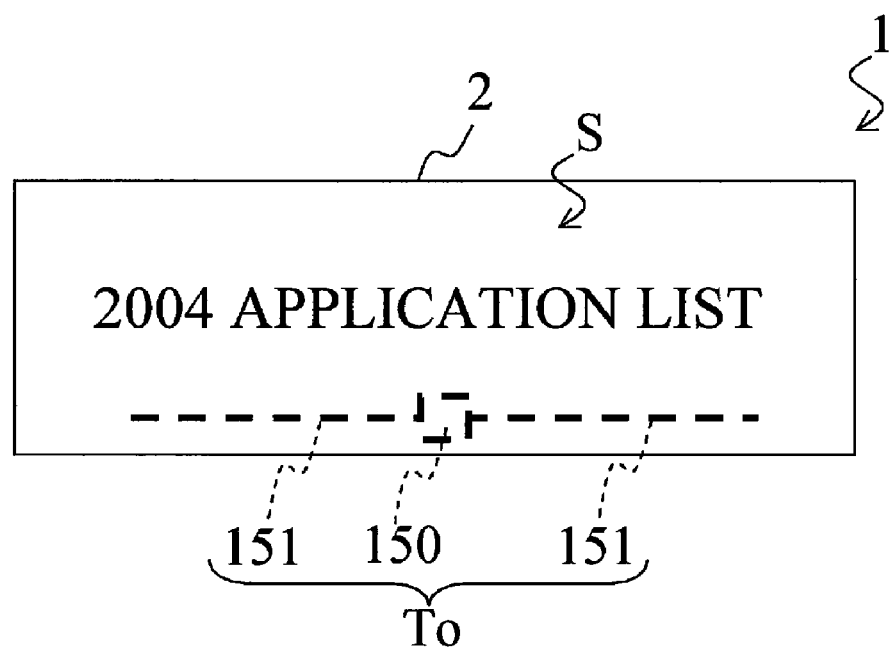

[FIG.2]
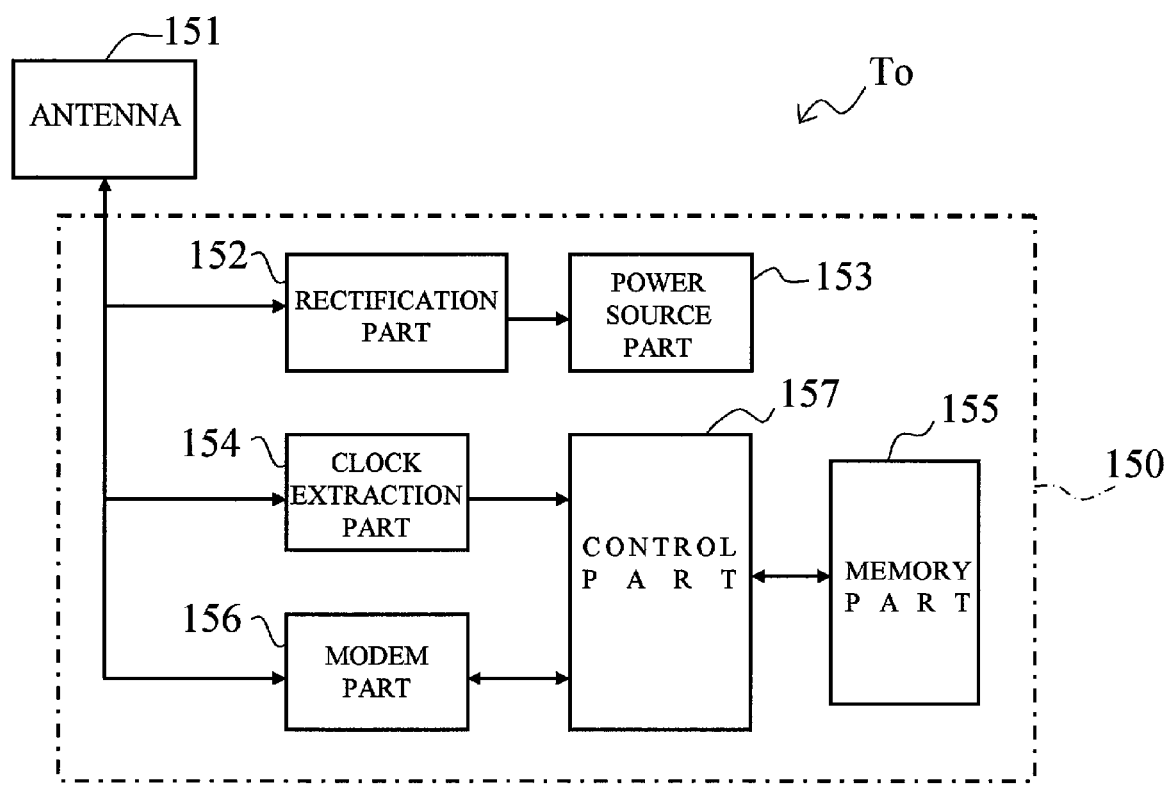

[FIG.3]
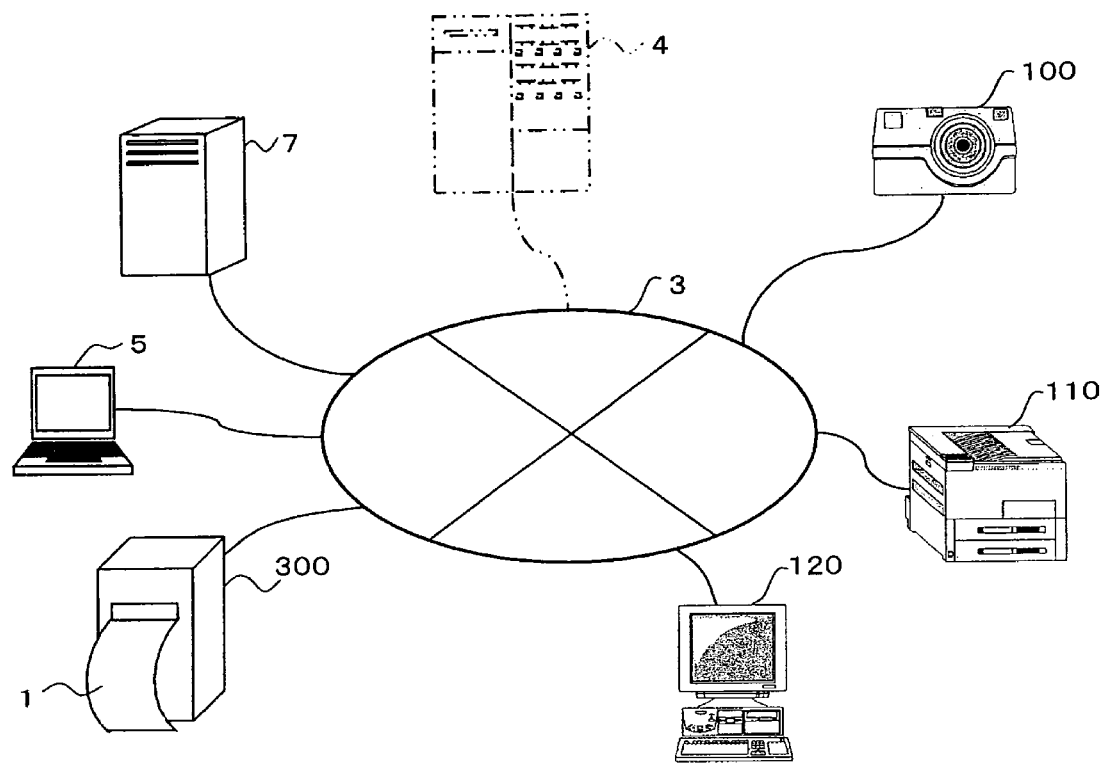

[FIG.4]
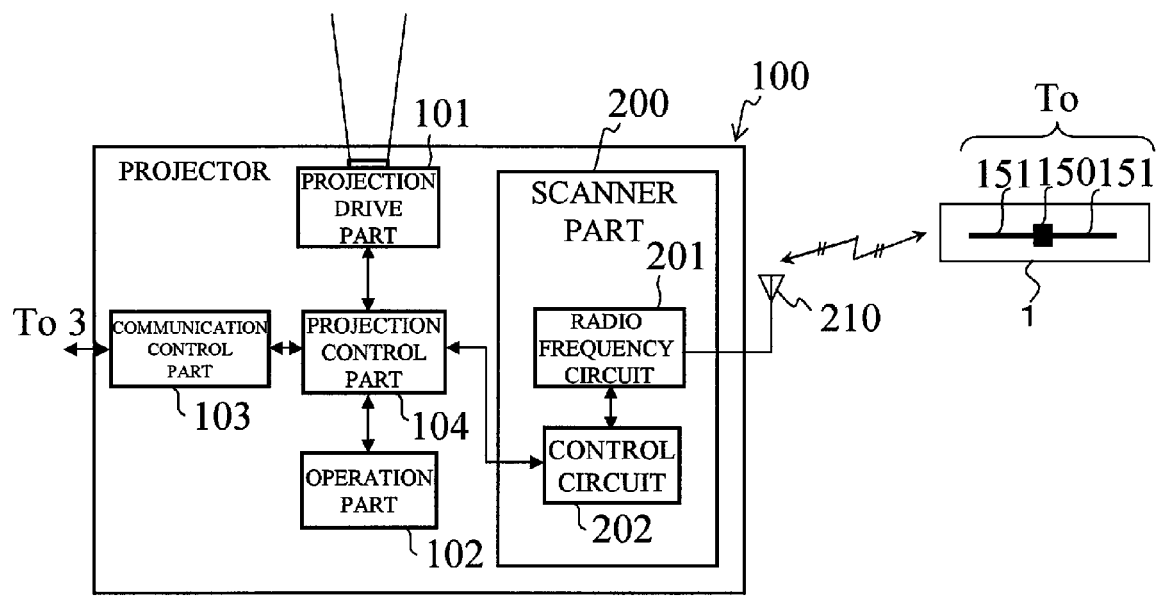

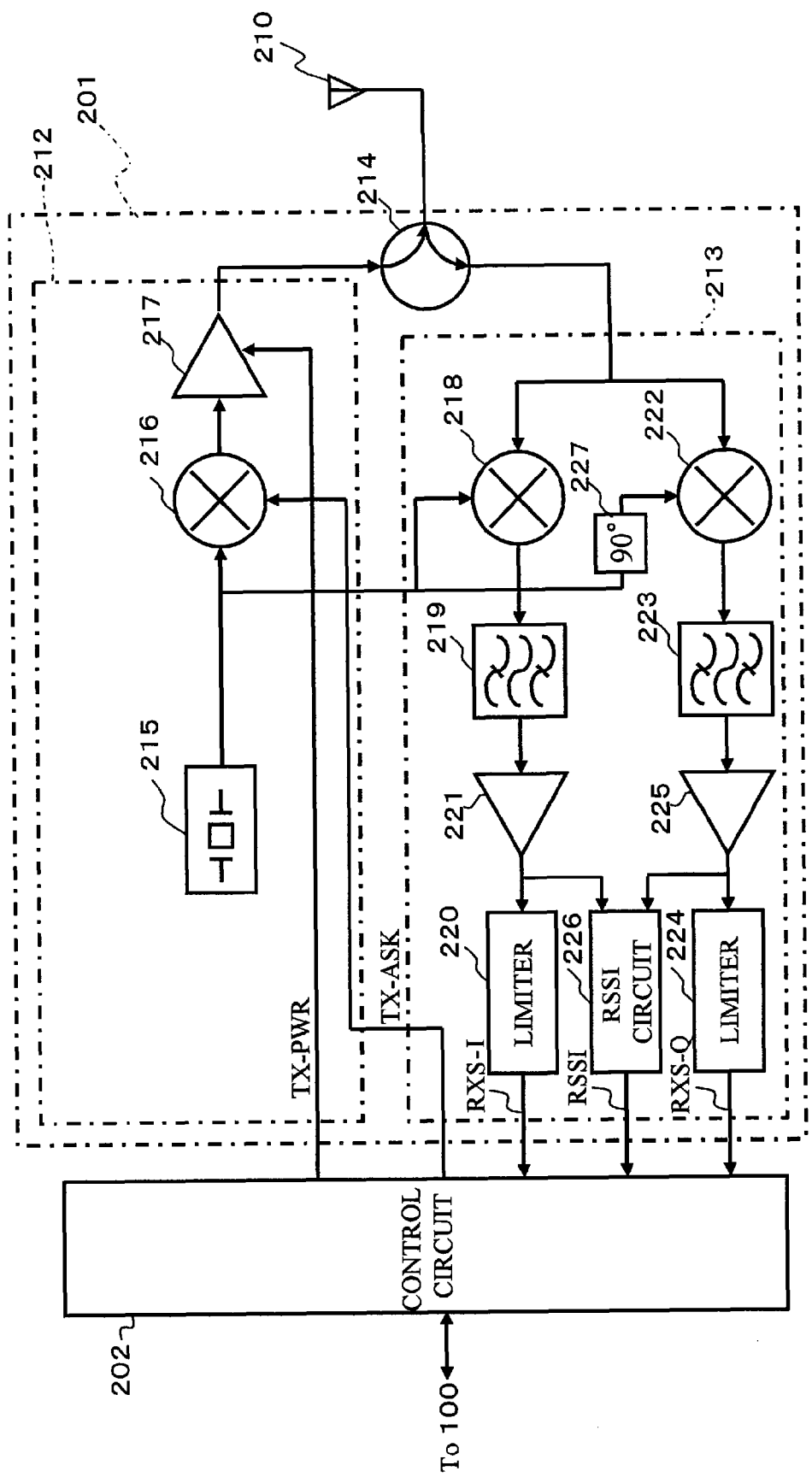
[FIG.5]

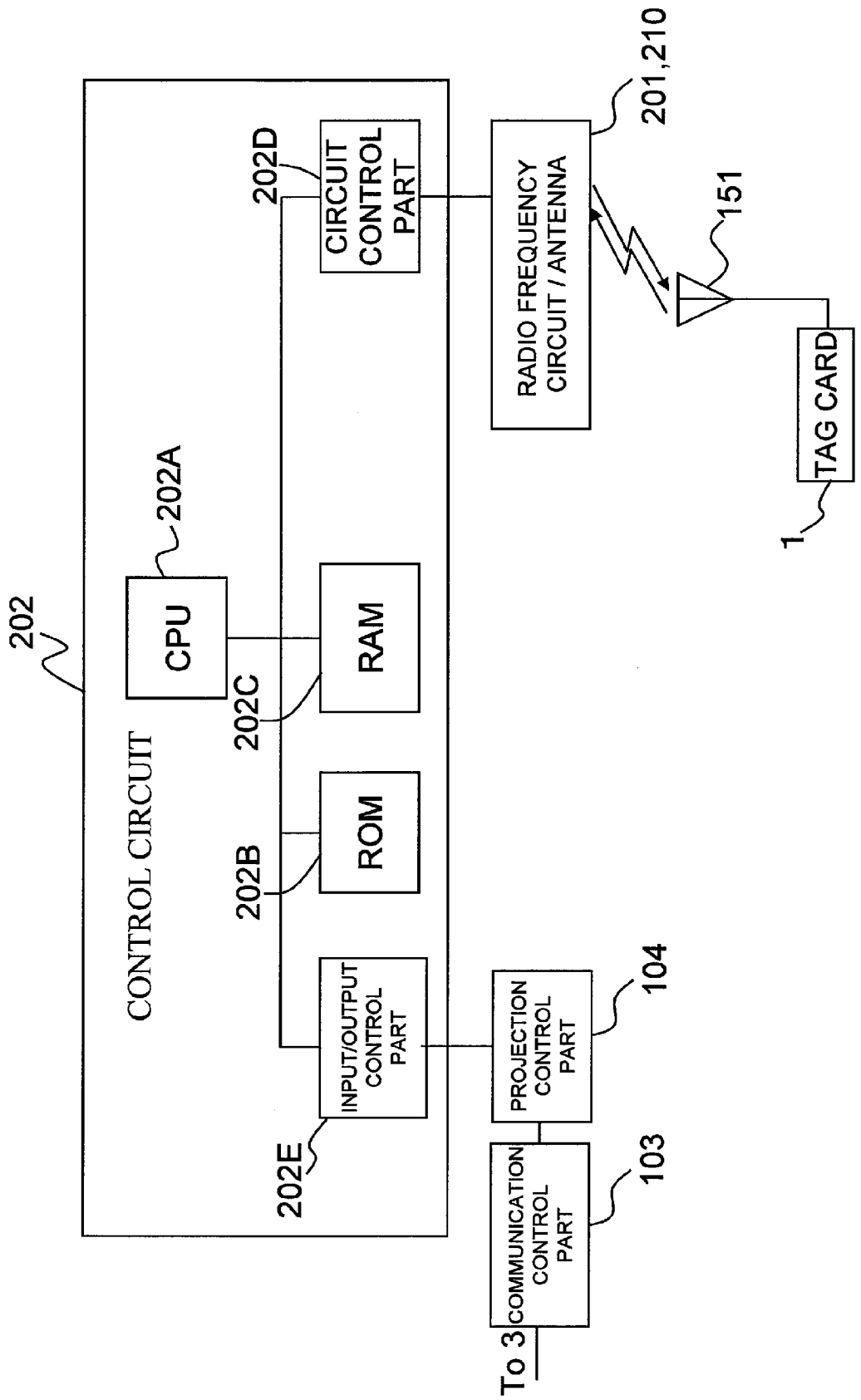
[FIG.6]

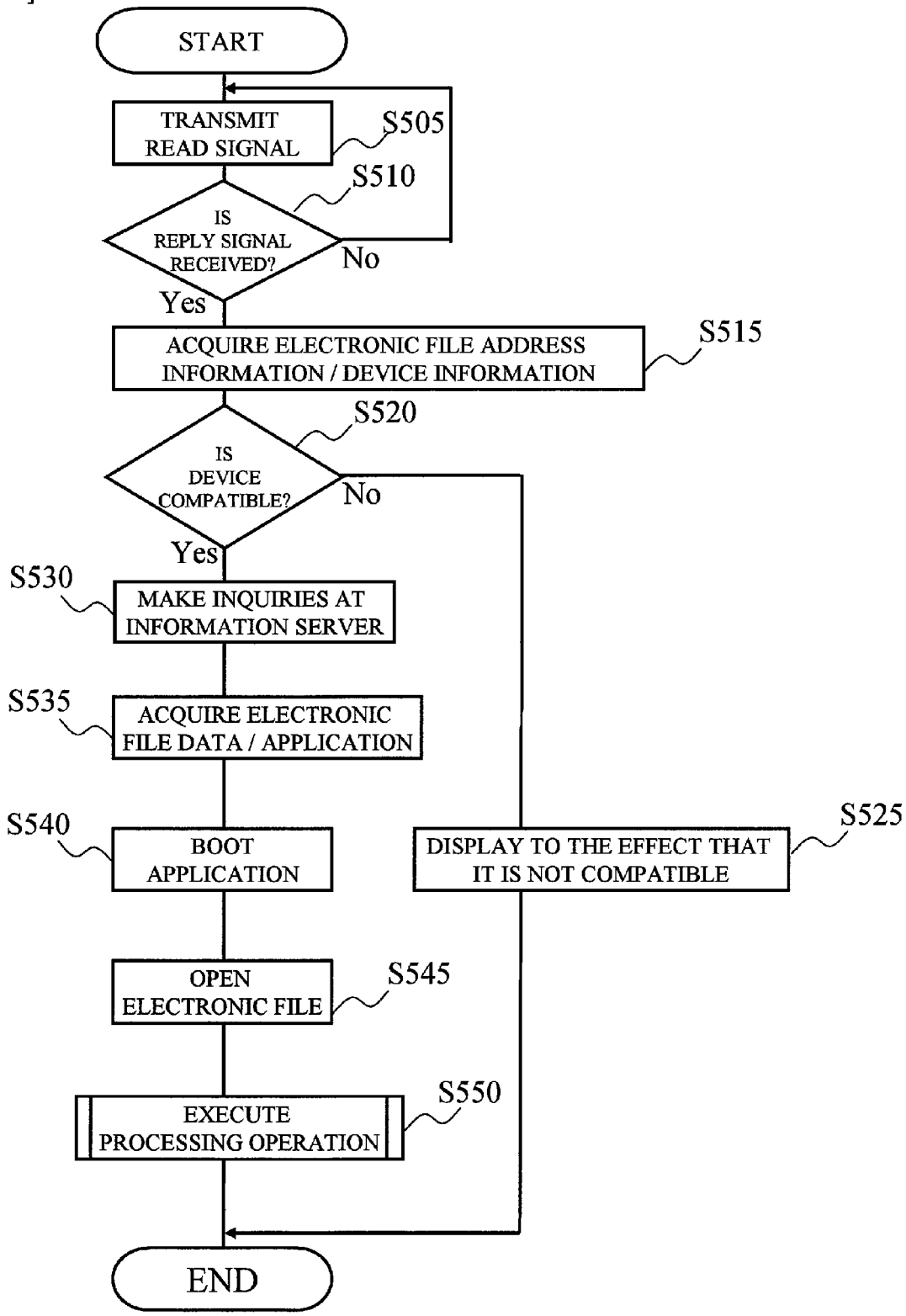

[FIG.8]
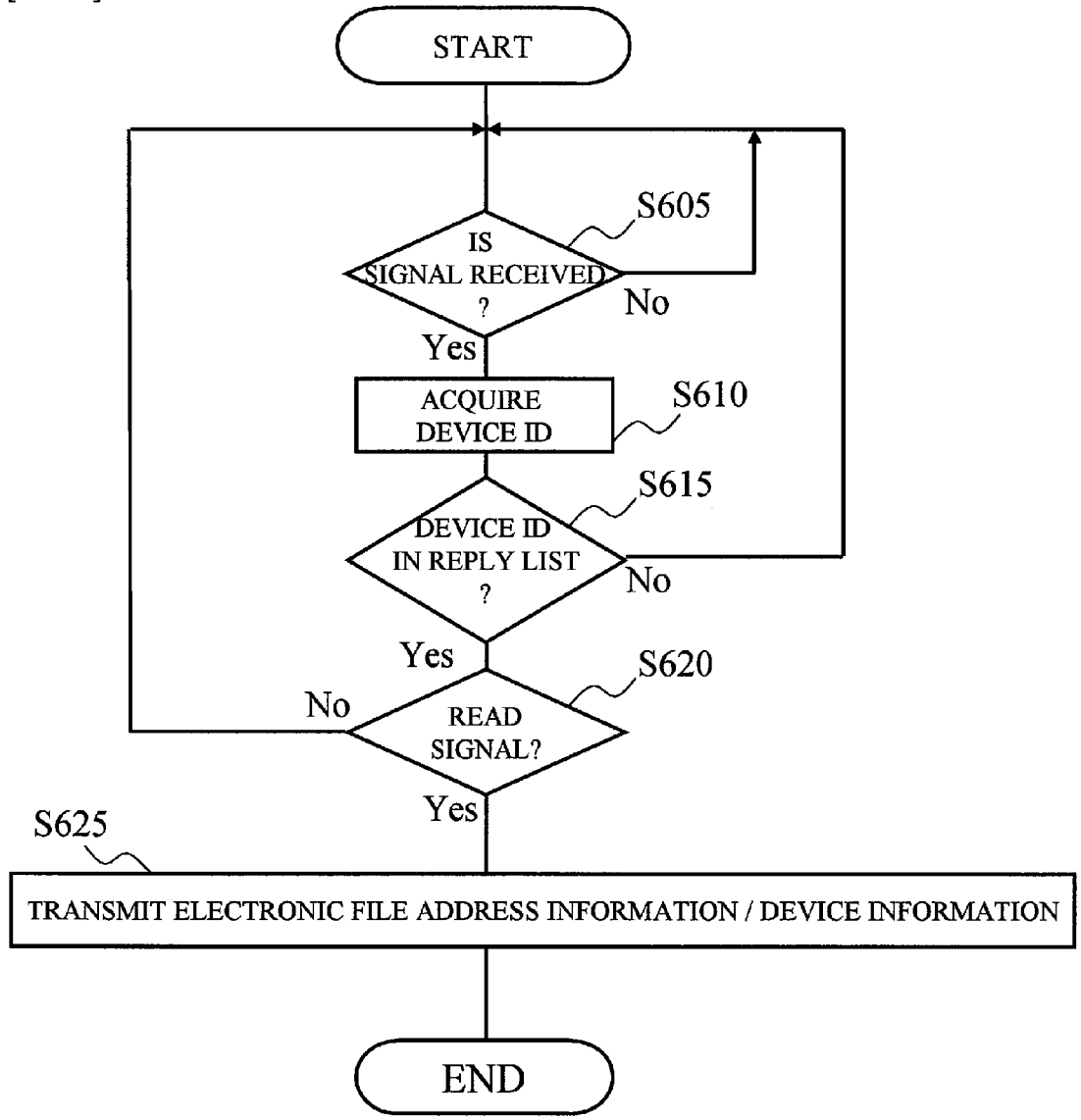

[FIG.9A]

| TAG ID | ELECTRONIC FILE ADDRESS | DEVICE TYPE ID |
|---|---|---|

[FIG.9B]

| TAG ID | ELECTRONIC FILE ADDRESS | DEVICE TYPE ID + DEVICE INDIVIDUAL ID |
|---|---|---|

[FIG.9C]

| TAG ID | ELECTRONIC FILE ADDRESS | DEVICE TYPE ID + DEVICE INDIVIDUAL ID + OPERATION |
|---|---|---|

[FIG.9D]

| TAG ID | ELECTRONIC FILE ADDRESS | DEVICE 1 ID | DEVICE 2 ID | DEVICE 3 ID |
|---|---|---|---|---|

[FIG.9E]

| TAG ID | ELECTRONIC FILE ADDRESS 1 | ELECTRONIC FILE ADDRESS 2 | ELECTRONIC FILE ADDRESS 3 | DEVICE TYPE ID |
|---|---|---|---|---|

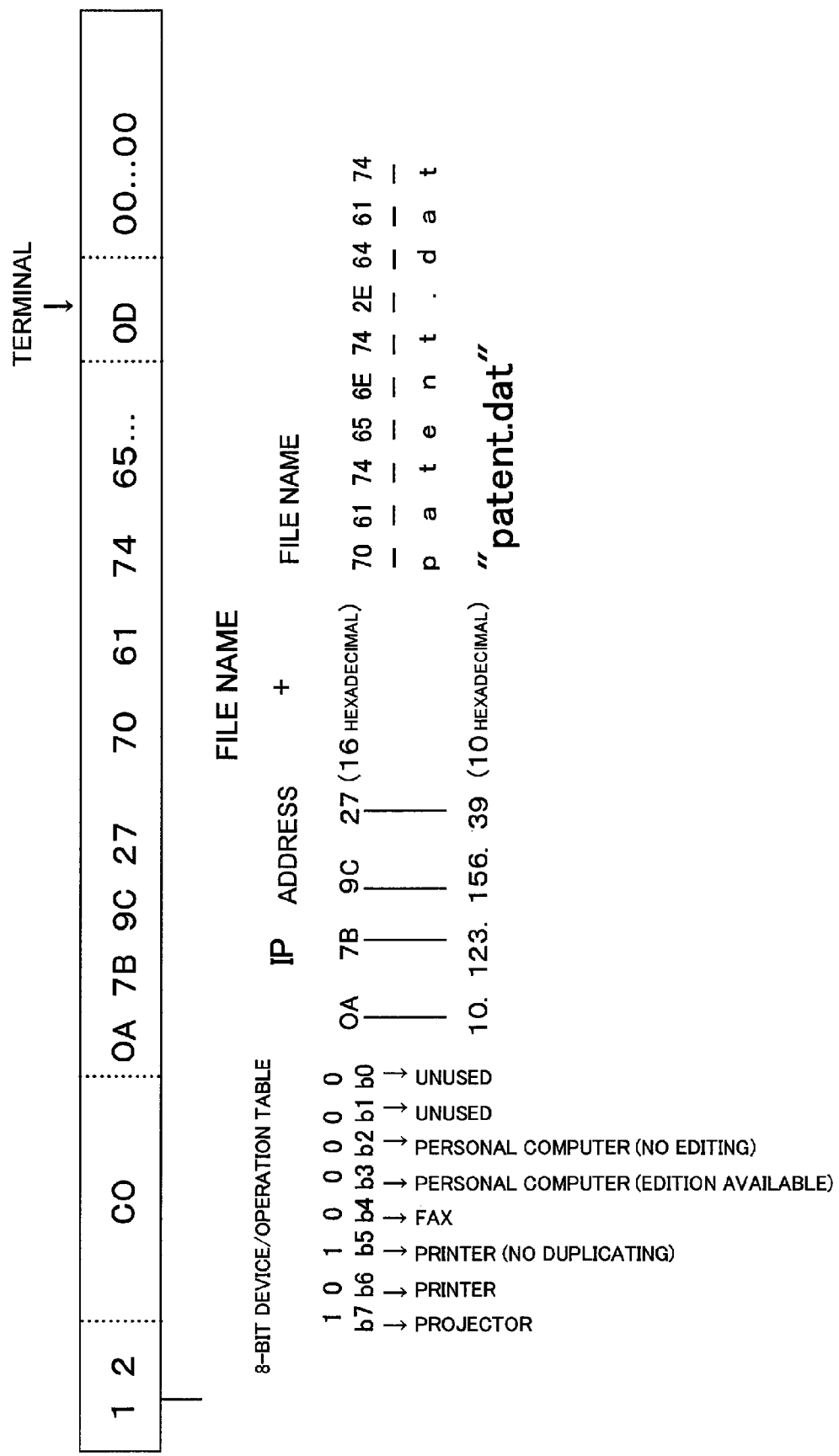

[FIG.11]
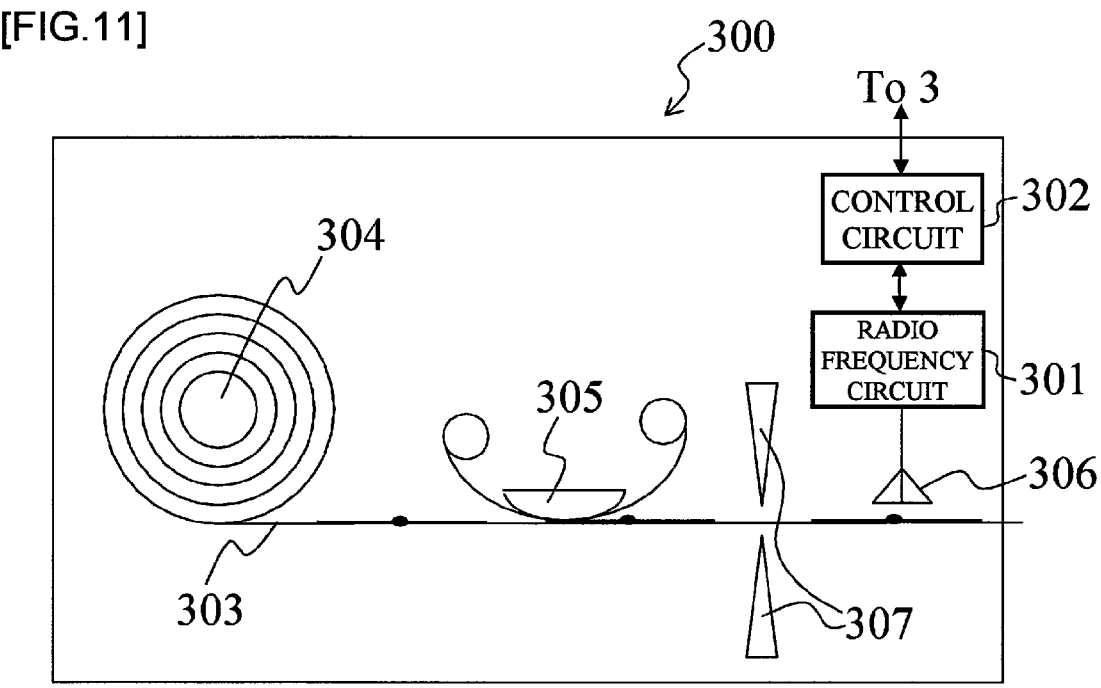

[FIG.12]
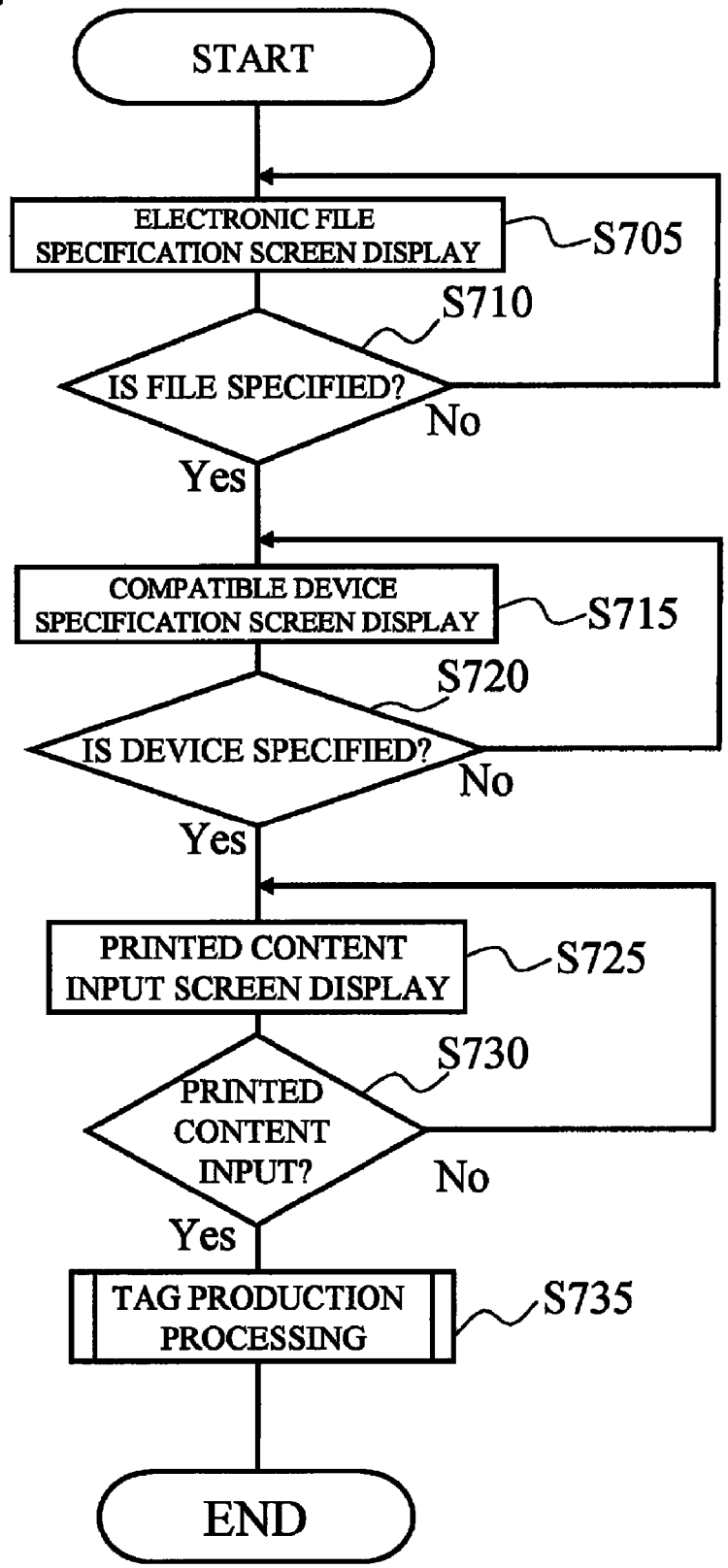

[FIG.13A] 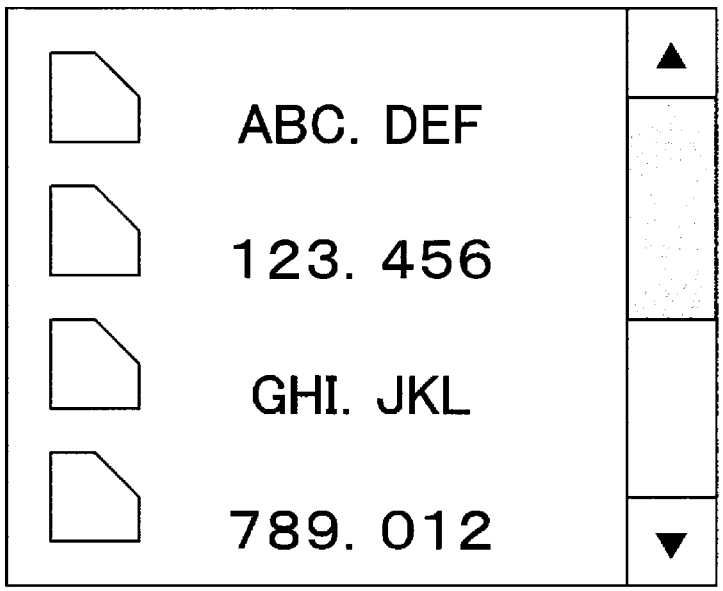
[FIG.13B] 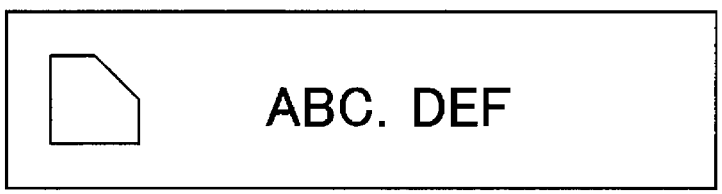
[FIG.13C] 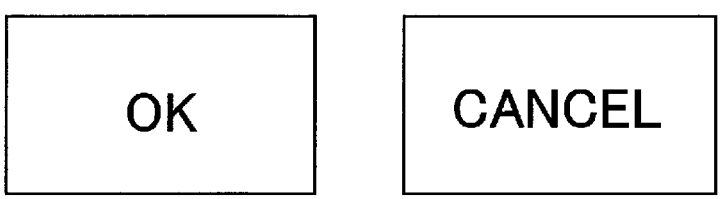

[FIG.14A]

☒ PROJECTOR
☐ PRINTER
☒ PRINTER (DUPLICATION PROHIBITED)
☐ FAX
☐ PERSONAL COMPUTER (NO EDITING)
☐ PERSONAL COMPUTER (EDITION AVAILABLE)

[FIG.14B]

2004 APPLICATION LIST

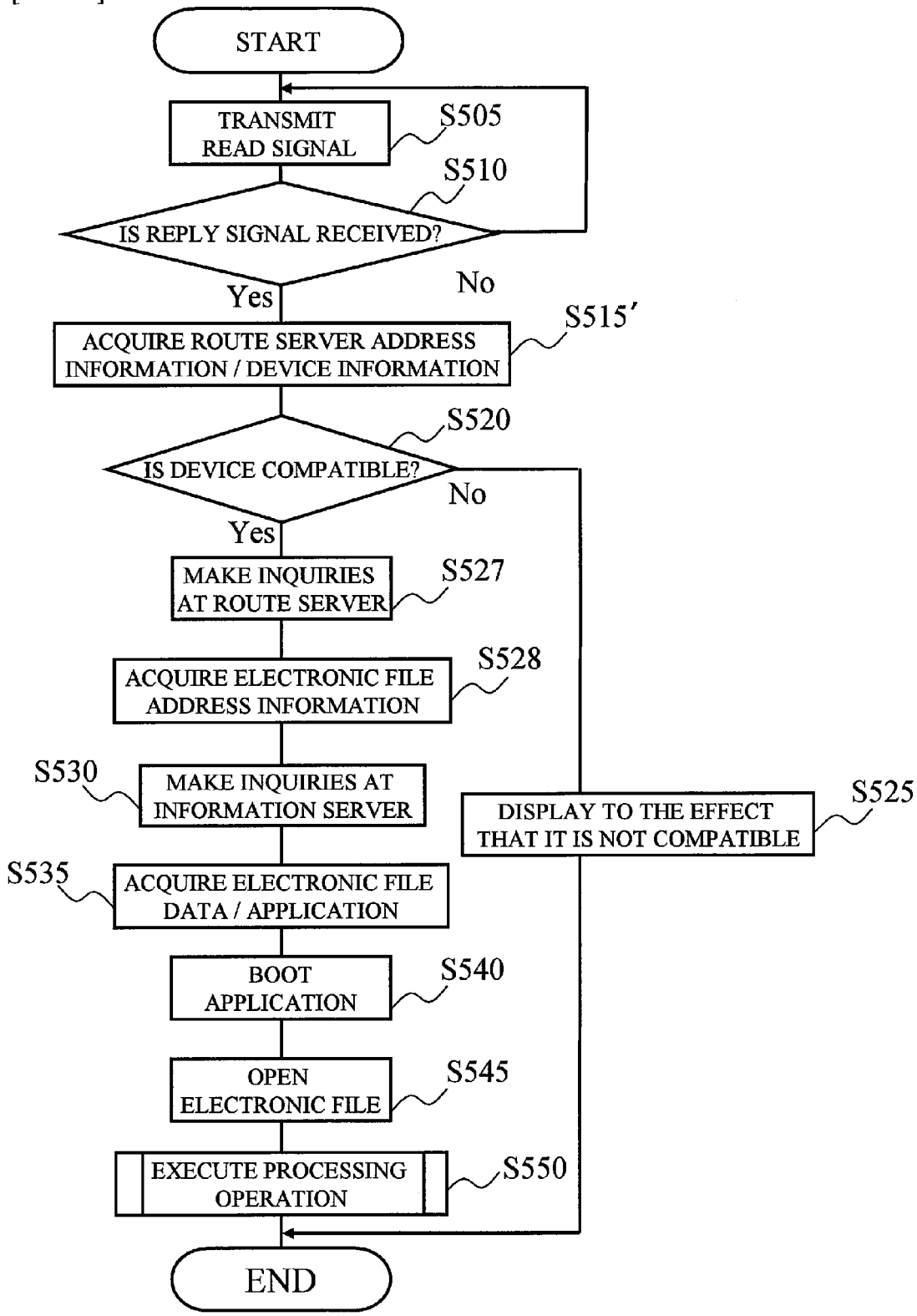
[FIG.15]

RFID TAG, DEVICE FOR COMMUNICATING WITH A RFID TAG, SYSTEM FOR COMMUNICATING WITH A RFID TAG, AND APPARATUS FOR PRODUCING RFID TAG

CROSS-REFERENCE TO RELATED APPLICATION

This is a CIP application PCT/JP2006/305132, filed Mar. 15, 2006, which was not published under PCT article 21(2) in English and claims the benefits of Japanese Patent application No. 2005-077452 filed Mar. 17, 2005.

BACKGROUND OF THE INVENTION

1. Field of the Invention

The present invention relates to a RFID tag capable of reading and writing information contactlessly, a device for communicating with a RFID tag configured to operates using the information, a system for communicating with a RFID tag including the RFID tag and the device for communicating with a RFID tag, and a Apparatus for producing RFID tag for manufacturing the RFID tag.

2. Description of the Related Art

A radio frequency identification (RFID) system in which information is read/written contactlessly between a small RFID tag and a reader/writer is known. A RFID circuit element provided in a RFID tag includes an IC circuit part configured to store predetermined RFID tag information and an antenna connected to the IC circuit part for transmission and reception of information, and even when the RFID tag is stained or arranged at a position not visible, the reader/writer can access RFID tag information (to read/write information) in the IC circuit part from the reader/writer side, and is being put to practical use in various fields, such as in product management, inspection process, etc.

For example, a prior art using a mobile information terminal as a reader is described in JP, Z, 3085050. In this prior art, RFID tag information stored in a RFID tag attached to an advertising medium includes URL information of a website of the advertisement and when the RFID tag information is read from the RFID circuit element using the mobile information terminal as a device for communicating with a RFID tag, the URL is accessed automatically by the mobile information terminal and the contents of the website are displayed.

As described above, data transmission/reception by radio communication using a RFID tag is already known and being put to practical use. However, after the RFID tag is accessed and predetermined data is acquired, if the data (a so-called electronic file etc.) is intended to be subjected to processing, such as printing, projecting by the projector, editing of the data itself, etc., it is generally necessary to cause the device for communicating with a RFID tag to specify the transferred electronic files one by one and carry out the corresponding operation (printing, projecting, editing, or displaying a list for preparation) after the electronic files are transferred to the device for communicating with a RFID tag from the RFID tag. Because of this, it is unavoidable for an operator to carry out troublesome operations, and there is a problem of convenience.

With the above-mentioned prior art, it is only possible to carry out operations determined in advance, such as to provide a predetermined display or music using a simple function, such as an image display function or voice generation function, originally provided in the mobile terminal after accessing the URL relating to the attachment (advertisement) of the RFID tag and acquiring predetermined data, and it is not possible to carry out processing intended by the operator, such as printing, projecting, editing, etc., or to carry out extended, complicated processing functions.

SUMMARY OF THE INVENTION

An object of the present invention is to provide a RFID tag capable of causing various processing functions to be executed for an electronic file acquired from the RFID tag without the need for an operator to carry out troublesome operations, and thus improving convenience of the operator, a device for communicating with a RFID tag configured to carry out its processing operations, a system for communicating with a RFID tag including the RFID tag and the device for communicating with a RFID tag, and a Apparatus for producing RFID tag for manufacturing the RFID tag.

BRIEF DESCRIPTION OF THE DRAWINGS

FIG. 1 is a top view showing a general schematic structure of a RFID tag in an embodiment of the present invention.

FIG. 2 is a block diagram showing an example of a functional configuration of a RFID circuit element provided at a tag provided in a tag card.

FIG. 3 is a system configuration diagram showing the whole of a system for communicating with a RFID tag including a server, a projector, etc.

FIG. 4 is a functional block diagram showing detailed functions of a projector.

FIG. 5 is a functional block diagram showing a detailed functional configuration of a radio frequency circuit.

FIG. 6 is a functional block diagram showing detailed functions of a control circuit.

FIG. 7 is a flow chart showing a control procedure executed by a projection control part and a control circuit provided in a projector.

FIG. 8 is a flow chart showing a control procedure executed by a control part arranged in an IC circuit part provided in a RFID circuit element.

FIG. 9 is a diagram showing a data configuration example of information stored in the IC circuit part.

FIG. 10 is a diagram showing a more specific example of a data structure stored in the IC circuit part.

FIG. 11 is a schematic configuration diagram showing an example of a tag card producing apparatus.

FIG. 12 is a flow chart showing a control procedure executed by a control circuit.

FIG. 13 is a diagram showing an example of a display screen displayed on a display device of a terminal or a tag card producing apparatus when a tag card is manufactured.

FIG. 14 is a diagram showing an example of a display screen displayed on the display device of a terminal or a tag card producing apparatus when a tag card is manufactured.

FIG. 15 is a flow chart showing a control procedure executed by a projection control part and a control circuit provided in a projector in a variation in which a shortcut file is provided in a route server.

DETAILED DESCRIPTION OF THE PREFERRED EMBODIMENTS

An embodiment of the present invention will be described below with reference to drawings.

FIG. 1 is a top view showing a general schematic structure of a RFID tag in the present embodiment. In FIG. 1, a RFID tag (tag card) 1 includes a base 2 (card base) in the shape of substantially a rectangular thin plate, and a RFID circuit element To arranged on the base 2 and having an IC circuit part 150 configured to store information and an antenna 151 connected to the IC circuit part 150.

There is provided on the surface (top surface) of the base 2 an area S (an expression area; in this example, the letters of "2004 Application List") in which the content of an electronic file is expressed (printed or written by hand), for which predetermined processing is performed (details are to be described later) by the tag card 1. Instead of letters, figures, symbols, or just colors or patterns may be accepted as long as they provide the recognition and identification of the content of the electronic file in any form. Further, the size of the tag card 1 can be various ones, for example, that of a name card. A sheet of paper of normal A4 size or B5 size (one not printed thereon may be accepted), to which the RFID circuit element To is attached (for example, one to which a label-shaped material is attached), may also be accepted.

In this example, the RFID circuit element To is arranged on one side (on the lower side in FIG. 1 in this example) biased from the center (the center in the vertical direction in FIG. 1 in this example) in the direction of the plane of the base 2. In other words, the RFID circuit element To is arranged so that it overlaps the area S as little as possible in the planar view.

FIG. 2 is a block diagram showing an example of a functional configuration of the RFID circuit element To provided in the tag card 1.

In FIG. 2, the RFID circuit element To has the antenna 151 (tag antenna) configured to transmit and receive signals contactlessly to and from an antenna 210 on the side of a scanner part 200 of a projector 100, to be described later, using radio frequencies in a short-wave band (for example, 13.56 MHz), UHF band, microwave band, etc., and the IC circuit part 150 connected to the antenna 151.

The IC circuit part 150 includes a rectification part 152 configured to rectify carrier waves received by the antenna 151, a power source part 153 configured to accumulate the energy of the carrier waves rectified by the rectification part 152 to use it as a drive power source of the IC circuit part 150, a clock extraction part 154 configured to extract a clock signal from the carrier waves received by the antenna 151 and supplies it to a control part 157 (to be described later), a memory part 155 that functions as an information storage part capable of storing a predetermined information signal, a modem part 156 connected to the antenna 151, and a control part 157 configured to control the operation of the RFID circuit element To via the rectification part 152, the clock extraction part 154, the modem part 156, etc.

The modem part 156 demodulates a communication signal from the antenna 210 of the scanner part 200 (interrogator) received by the antenna 151 and at the same time, modulates and reflects the carrier waves received by the antenna 210 based on the reply signal from the control part 157.

The control part 157 executes basic control of interpreting the received signal demodulated by the modem part 156, generating a reply signal based on the information signal stored in the memory part 155, and replying with the modem part 145, etc.

In the tag card 1 with the above-mentioned configuration, the IC circuit part 150 of the RFID circuit element To stores and holds file information (in this example, address information of the file "2004 Application List" described above. Details will be described later.) about an electronic file to be processed and device information (in this example, ID of the projector 100 configured to carry out projection. In addition, a printer configured to print out, a personal computer configured to display a list for data edition, a fax, etc., may be accepted. Details will be described later.) about devices for communicating with a RFID tag capable of executing the predetermined processing operation for the electronic file. Then, by bringing the tag card 1 close to the side of the device for communicating with a RFID tag fitted with a reading function of the RFID circuit element To (by causing it to exist in the range where communication is available) so that the file information and device information are acquired by the device for communicating with a RFID tag, the electronic file is read to the device for communicating with a RFID tag from the information server and at the same time, the electronic file is subjected to the above-mentioned predetermined processing operation.

FIG. 3 is a system configuration diagram showing the entire system for communicating with a RFID tag including the server and the projector 100 as a device for communicating with a RFID tag.

The RFID tag information communication system shown in FIG. 3 includes a function of accessing (reading, in this example) information of the RFID circuit element To provided in the tag card 1 and at the same time, and includes the projector 100 as a device for communicating with a RFID tag equipped with a normal projection function. In addition, the system includes a printer 110 and a personal computer 120 having the same function of accessing a RFID tag as that of the projector 100 as another device for communicating with a RFID tag in this example. The projector 100, the printer 110, and the personal computer 120 are connected to an information server (contents server) 7 and a terminal (or a general purpose computer) 5 configured to store and hold a plurality of various kinds of electronic files so that they can be read via a wired or wireless communication line 3. As will be described later, a route server (address server) 4 may be provided. In this example, a tag card producing apparatus 300 configured to produce the tag card 1 is also connected to the communication line 3 (details will be described later).

FIG. 4 is a functional block diagram showing detailed functions of the projector 100. In FIG. 4, the projector 100 has a projection driving part 101 for projecting an object to be projected (in this example, image of an electronic file etc.) on an object on which an object to be projected is projected (for example, a screen etc.), an operation part 102 configured to provide an operator with various operations, a communication control part 103 configured to control the transmission and reception of communication data and various signals to and from the communication line 3, the scanner part 200 configured to carry out the reading function mentioned earlier, and a projection control part 104 connected to the projection driving part 101, the operation part 102, the communication control part 103, and the scanner part 200 to execute operation control of the entire projector 100.

The projection control part 104 includes, for example, a CPU, RAM, ROM, etc., not shown, and performs predetermined arithmetic processing by inputting a signal from the scanner part 200, generates an image of the acquired electronic file as a projection signal, and outputs it to the projection driving part 101.

The scanner part 200 has the antenna (device antenna) 210 for transmitting and receiving signals to and from the antenna 151 of the RFID circuit element To by radio communication, a radio frequency circuit 201 for processing the signal read from the RFID circuit element To as well as accessing (reading, in this example) the IC circuit part 150 of the RFID circuit element To via the antenna 210, and a control part 202 including the function of generating access information for accessing the IC circuit part 150 of the RFID circuit element To as well as processing the signal read from the IC circuit part 150 of the RFID circuit element To via the radio frequency circuit 201 to read the information, and controlling the operation of the entire scanner part 200.

FIG. 5 is a functional block diagram showing a detailed functional configuration of the radio frequency circuit 201.

In FIG. 5, the radio frequency circuit 201 is composed of a transmitting portion 212 for transmitting a signal to the RFID circuit element To via the antenna 210, a receiving portion 213 for receiving a reflected wave from the RFID circuit element To received by the antenna 210, and a transmit-receive splitter 214.

The transmitting portion 212 includes an oscillation circuit 215 that functions as a carrier wave generating part for generating a carrier wave to access (read/write) the RFID tag information (in this example, address information of an electronic file, details to be described later) of the IC circuit part 150 of the RFID circuit element To, a transmission multiplying circuit 216 (in the case of the "TX_ASK signal", an amplification factor variable amplifier may be used) for modulating (in this example, amplitude modulation based on the "TX_ASK" signal from the control circuit 202) the carrier wave generated by the carrier wave generating part based on the signal supplied from the control circuit 202, and a variable transmission amplifier 217 for amplifying (in this example, amplification the amplification factor of which is determined by the "TX_PWR" signal from the control circuit 202) the modulated wave modulated by the transmission multiplying circuit 216. Then, the carrier wave generated by the carrier wave generating part uses radio frequencies, such as the short-wave band (13.56 MHz etc.), the UHF band, the microwave band, etc., and the output of the transmission amplifier 217 is transmitted to the antenna 210 via the transmit-receive splitter 214 and supplied to the IC circuit part 150 of the RFID circuit element To. There may be the case where the RFID tag information to be transmitted and received is just a mere carrier wave, not limited to the modulated signal as described above.

The receiving portion 213 includes a first receiving signal multiplying circuit 218 for multiplying the reflected wave from the RFID circuit element To received by the antenna 210 and the generated carrier wave, a first band-pass filter 219 for extracting only a signal in a necessary band from the output of the first receiving signal multiplying circuit 218, a first receiving signal amplifier 221 for amplifying the output of the first band-pass filter 219, a first limiter 220 for further amplifying the output of the first receiving signal amplifier 221 to convert it into a digital signal, a second receiving signal multiplying circuit 222 for multiplying the reflected wave from the RFID circuit element To received by the antenna 210 and the carrier wave delayed 90 degrees in phase by a phase shifter 227 after generated, a second band-pass filter 223 for extracting only a signal in a necessary band from the output of the second receiving signal multiplying circuit 222, a second receiving signal amplifier 225 for further amplifying the output of the second band-pass filter 223, and a second limiter 224 for further amplifying the output of the second receiving signal amplifier 225 to convert it into a digital signal. Then, a signal "RXS_I" output from the first limiter 220 and a signal "RXS_Q" output from the second limiter 224 are input to the control circuit 202 and subjected to processing.

The outputs of the first receiving signal amplifier 221 and the second receiving signal amplifier 225 are also input to a received signal strength indicator (RSSI) circuit 226 as a strength detector and a signal "RSSI" indicative of the strength of the signal is input to the control circuit 202. As described above, in the scanner part 200, the reflected wave from the RFID circuit element To is demodulated by the I-Q quadrature demodulation in this example.

The control circuit 202 performs predetermined arithmetic processing for processing the signal read from the RFID circuit element To after receiving the received signal from the radio frequency circuit receiving portion 213 as well as outputting the amplification control signal and the modulation control signal to the radio frequency circuit transmitting portion 212.

FIG. 6 is a functional block diagram showing the detailed functions of the control circuit 202.

In FIG. 6, the control circuit 202 is a so-called microcomputer, and composed of a CPU 202A, which is a central processing unit, a ROM 202B, a RAM 202C, a circuit control part 202D for transmitting and receiving signals to and from the radio frequency circuit 201, an input/output control part 202E for transmitting and receiving signals to and from the projection control part 104, etc., and performs signal processing in accordance with programs stored in advance in the ROM 203B using the temporary storage function of the RAM 202C. The control circuit 202 is capable of transmitting and receiving information with the information server 7, the terminal 5, etc., via the projection control part 104 and the communication line 3.

FIG. 7 is a flow chart showing a control procedure executed by the projection control part 104 and the control circuit 202 provided in the projector 100.

First, in step S505, a signal to read information stored in the IC circuit part 150 of the RFID circuit element To in the tag card 1 is transmitted via the radio frequency circuit 201 and the antenna 210. In detail, a "Scroll ALL ID" signal (or "Ping" signal) to read information stored in the RFID circuit element To is generated and transmitted via the radio frequency circuit 201 to the RFID circuit element To present in the range in which communication is available to prompt reply. On this occasion, identification information (device ID) unique to the projector 100 is also transmitted to the RFID circuit element To in order for the RFID circuit element To recognize the device for communicating with a RFID tag (refer to step S610 in FIG. 8, to be described later). The device ID may be an ID given to each type of device or an ID given to an individual device.

After that, the operation goes to step S510, where it is determined whether or not a reply signal transmitted (returned) from the RFID circuit element To in accordance with the "Scroll ALL ID" signal is received via the antenna 210 and taken into the control circuit 202 via the radio frequency circuit 201.

If the reply signal has not been received, the determination is not satisfied and the operation returns to step S505 and the same procedure is repeated. If the reply signal has been received, the determination in step S510 is satisfied and the operation goes to step S515.

In step S515, the corresponding (associated with the tag card 1) address information (for example, the address of storage destination where an electronic file is stored in the information server 7. Refer also to FIG. 9, to be described later.) and the device information (for example, an ID that identifies the kind of a device for communicating with a RFID tag, an ID that identifies an individual, etc. Refer also to FIG. 9, to be described later.) about devices allowed to execute a predetermined processing operation for the electronic file are read and acquired from the reply signal received from the RFID circuit element To.

Next, in step S520, it is determined whether or not the device information acquired in step S515 matches with the projector 100. When it does not match, the determination is not satisfied and the operation goes to step S525, where a display to the effect that the projector 100 in question is not compatible as a device for communicating with a RFID tag required by the RFID circuit element To is output to the projection driving part 101 by the projection control part 104 of the projector 100 (or it may be displayed on the terminal 5 etc. via the communication line 3). As a result, it is possible to notify without fail the operator of that the projector 100 is not proper as a device configured to process the electronic file.

When the device information matches with or includes the projector 100, the determination in step S520 is satisfied and the operation goes to step S530. In step S530, an inquiry signal is output to the information server 7 via the communication line 3 based on the address information of the electronic file acquired in step S515.

After that, in step S535, the data of the electronic file, which is the processed object (in this example, the object projected by the projector 100) returned from the information server 7 in accordance with the inquiry signal in step S530 and a predetermined application (for example, drawing software for analyzing the structure of the electronic file) corresponding to the electronic file are acquired.

Then, in step S540, after the application acquired in step S535 is booted, the electronic file acquired in step S535 is opened on the booted application in step S545.

After that, in step S550, the electronic file created in step S545 is subjected to predetermined processing (in this example, projection by the projection driving part 101 of the projector 100) inherent to the device for communicating with a RFID tag and this flow is terminated.

FIG. 8 is flow chart showing a control procedure executed by the control part 157 arranged in the IC circuit part 150 of the RFID circuit element To provided in the tag card 1.

First, in step S605, it is determined whether or not the signal transmitted from the antenna 210 of the scanner part 200 is received by the antenna 151. When it has been received, the determination is satisfied and the operation goes to step S610.

In step S610, the identification information (device ID) of the device for communicating with a RFID tag (in this example, the projector 100) included in the signal the reception of which has been confirmed in step S605 is acquired. On this occasion, in the memory part 155, a list (a reply list in which devices to be replied are listed) of the devices suitable for performing the processing operation of the electronic file the address information of which has been stored in the RFID circuit element To is stored in advance, for example, in the form of a device ID, and in the next step S615, it is determined whether or not the device for communicating with a RFID tag matches with the reply list based on the device ID acquired in step S610. When it does not match with the list, the determination is not satisfied and the operation returns to step S605 and the same procedure is repeated.

When it matches with the list, the determination in step S615 is satisfied and the operation goes to step S620. In step S620, it is determined whether or not the received signal is the reading signal (the above-described "Scroll ALL ID" signal or the "Ping" signal, etc.) from the device for communicating with a RFID tag, which prompts reading of the stored content in the IC circuit part 150 of the RFID circuit element To. When it is a signal other than the reading signal, the determination is not satisfied and the operation returns to step S605 and the same procedure is repeated.

When it is the reading signal, the determination in step S620 is satisfied and in step S625, the address information of the electronic file and the device information stored in the IC circuit part 150 are transmitted to the antenna 210 of the scanner part 200 with the modem part 156 via the antenna 151 and this flow is terminated.

FIGS. 9A to 9E are diagrams each showing an example of a data structure of information (data) stored in the IC circuit part 150 of the RFID circuit element To and transmitted in step S625.

In the example shown in FIG. 9A, the data stored in the IC circuit part 150 of the RFID circuit element To consists of the tag identifier information (tag ID) described above, the file information (in this example, the address information in the information server 7 of the electronic file) about the electronic file to be processed, and the device information (in the above-described example, the device type ID of the projector 100 configured to carry out projection) about the devices for communicating with a RFID tag capable of executing the predetermined processing operation for the electronic file.

As shown in FIG. 9B, it may also be possible for the device information to further include the device individual ID provided for each device individual, in addition to the device type ID. Further, as shown in FIG. 9C, it may also be possible to include operation information about the operation allowed for the electronic file among the operation functions provided to the device, in addition to the device information, such as the device type ID, the device individual ID, etc. In these cases, it is possible not only to identify the device for communicating with a RFID tag allowed to carry out processing by the device information, but also to limit the operation allowed as a processing operation for the electronic file in the identified device for communicating with a RFID tag, while prohibiting other operations. Specifically, there can be the case where only the printing function or copy function is allowed for the electronic file when the device for communicating with a RFID tag is a composite machine of a copy machine, facsimile, and printer, or the case where only the listing of the electronic files is allowed and its edition is not allowed when the device for communicating with a RFID tag is a personal computer.

On the other hand, the example shown in FIG. 9D shows the case where a plurality of device type IDs is included (processing is allowed for a plurality of devices) as a device for communicating with a RFID tag capable of executing the predetermined processing operation for the electronic file in the example shown in FIG. 9A. As a result, it is possible to allow a plurality of kinds or a plurality of devices as a processing device of the electronic file.

The example shown in FIG. 9E shows the case where the address information of a plurality of files as an electronic file to be processed is included (a plurality of electronic files is processed altogether by a single device) in the example shown in FIG. 9A. As a result, it is possible to process a plurality of electronic files altogether in a corresponding predetermined device for communicating with a RFID tag.

FIG. 10 is a diagram showing a more specific example of the data structure stored in the IC circuit part 150. In FIG. 10, a data structure substantially corresponding to the example shown in FIG. 9C is shown in this example. First, at the beginning of the data, the tag ID expressed in eight bits ("12" in this example) is stored.

Next, that corresponding to the device information (device type ID)+operation information is stored. In this example, as the device type ID including operation information, the eight-bit corresponding table (however, the last two bits are unused) is prepared in advance as shown schematically. The first bit is a bit (b7) that indicates whether or not the projection operation by the projector is allowed, the second is a bit (b6) that indicates whether or not all of the operations (printing, copying, etc.) by the printer is allowed, the third is a bit (b5) that indicates whether or not only the printing operation (except for copying) by the printer is allowed, the fourth is a bit (b4) that indicates whether or not the transmission operation by the facsimile is allowed, the fifth is a bit (b3) that indicates whether or not all of the operations (listing, editing, etc.) by a personal computer are allowed, the sixth is a bit (b2) that indicates whether or not only the listing (except for editing) by the personal computer is allowed, and the last two bits (b1, b0) are not used. In this manner, the device and operation whose bit is "1" are allowed in terms of the data, and in this example, b7 bit and b5 bit are "1", that is, for the electronic file relating to the tag card 1, projection by the projector and printing by the printer are specified as executable processing and devices and "C0" (in hexadecimal notation) corresponding to the arrangement "10100000" is included as data.

Following this, the address information (in this example, the file name is included) of the electronic file is stored. First, an IP address is recorded and in this example, "0A 7B 9C 27", which is the address "10. 123. 156. 39" (in decimal notation) expressed in hexadecimal notation, is included. Following this, a file name is recorded, and in this example, "70 61 74 65 6E 74 2E 64 61 74", which is the name "patent.dat" is expressed in hexadecimal notation, is included.

Following this, "0D" indicative of the termination at which the address information of the file ends is recorded and the rest is filled with "000 . . . 00" recorded therein.

The tag card 1 is configured and used as described above. As the Apparatus 300 for producing RFID tag for manufacturing the tag card 1, an apparatus, for example, as shown in FIG. 11 is used.

In FIG. 11, the tag card producing apparatus 300 (Apparatus for producing RFID tag) has a roll 304 of tape with RFID tag winding a tape 303 with RFID tag provided with RFID circuit elements To at predetermined intervals, a print head 305 configured to make a predetermined print in the area S corresponding to each of the RFID circuit elements To on the tape 303 with RFID tag fed out from the roll 304 of tape with RFID tag, an antenna 306 (apparatus antenna) configured to transmit and receive information to and from the RFID circuit element To by radio communication, a radio frequency circuit 301 and a control circuit 302, and a cutter 307 configured to cut the tape 303 with RFID tag on which the printing and writing of information to the RFID circuit element To have been completed to a predetermined length to obtain the tag card 1.

Although detailed explanation is omitted, the radio frequency circuit 301 and the control circuit 302 include the functions equivalent to those of the radio frequency circuit 201 and the control circuit 202 of the scanner part 200, and generate access information to the IC circuit part 150 of the RFID circuit element To, transmit it to the RFID circuit element To via the apparatus antenna 306, and write information to the IC circuit part 150 of the RFID circuit element To. The control circuit 302 is connected to the communication line 3 so as to be capable of transmitting and receiving information.

FIG. 12 is a flow chart showing a control procedure executed by the control circuit 302. In FIG. 12, first, in step S705, the electronic file stored in advance in the information server 7 is searched for via the communication line 3 and its information (including address information) is acquired. After that, a signal for displaying a screen on which a file is specified, among the electronic files stored in the information server 7 to be associated with the tag card 1, is output to the terminal 5 via, for example, the communication line 3 and it is displayed on the display device of the terminal 5 (refer to FIG. 13 to be described later. Or, it may be displayed on a proper display device provided in the tag card producing apparatus 300. This applies hereinafter).

When there is an input to specify an electronic file by the operator via the terminal 5 (or via a proper operation means provided in a tag card producing apparatus 300. This applies hereinafter.) in accordance with the display, the determination in the next step S710 is satisfied and the operation goes to step S715. In addition to the electronic files stored in advance in the information server 7 as described above, when electronic files not stored yet are intended to be newly registered, it may also be possible to display the file information in step S705 and newly store the electronic file in the information server 7 when the file is specified in step S710 (the address information on this occasion is also acquired).

In step S715, a signal is output to the terminal 5, which signal causes a screen to be displayed on which devices for communicating with a RFID tag (for example, the above-described projector, printer, copy machine, fax machine, composite machine, personal computer, etc.) are specified and displayed, which are caused to carry out a predetermined processing operation for the electronic file associated with the tag card 1 in step S705 (refer to FIG. 14A to be described later).

When there is an input to specify a device for communicating with a RFID tag by the operator via the terminal 5 in accordance with the display, the determination in the next step S720 is satisfied and the operation goes to step S725.

In step S725, a signal is output to terminal 5, which signal causes a screen to be displayed to which print contents intended to be printed by the print head 305 to the tag card 1 are input and displayed (refer to FIG. 14B to be described later).

When there is an input of the print contents by the operator via the terminal 5 in accordance with the display, the determination in the next step S730 is satisfied and the operation goes to step S735.

In step S735, tag producing processing is performed. In other words, access information to the IC circuit part 150 of the RFID circuit element To is generated via the radio frequency circuit 301, it is transmitted to the RFID circuit element To via the apparatus antenna 306, and information is written to the IC circuit part 150. On this occasion, for the tag ID, a new ID is produced and written by a publicly known proper method and the address stored in the information server 7 of the electronic file specified in step S705 and S710 in FIG. 12 and the device ID etc. of the device for communicating with a RFID tag specified in step S715 and S720 in FIG. 12 are also written. As a result, information with the data structure illustrated in FIGS. 9A to 9E and FIG. 10 is stored and held in the memory part 155 of the IC circuit part 150. At the same time, a control signal is output to the driving circuit (not shown) configured to drive the print head 305 and corresponding printing is carried out.

The functions of the projector 100 are mainly described in detail as an example of a device for communicating with a RFID tag, however, also in the printer 110 and the personal computer 120, the scanner part 200 similar to the projector 100 is arranged. Similar to the projector 100, the scanner part 200 of the printer 110 and the personal computer 120 reads the tag card 1 including file information (address information) of an electronic file and device information (device ID) in the IC circuit part 150, and after acquiring the electronic file data from the information server 7 based on the address information, carry out the predetermined processing for the electronic file (printing by the printer 110, displaying folders/files in a hierarchial list, editing by the personal computer 120, etc.)

FIGS. 13A to 13C are diagrams each showing an example of a display screen displayed on the terminal 5 (or on the display means of the tag card producing apparatus 300. This applies hereinafter.) in step S705 in FIG. 12 described above. In the example in FIG. 13, a file "ABC.DEF" is selected (refer to FIG. 13B) from among a plurality of files including "ABC.DEF", "1123.456", "GHI.JKL", and "789.012" (refer to FIG. 13A) and an "OK" button is pressed to fix the file (FIG. 13C).

FIG. 14A is a diagram showing an example of a display screen displayed on the terminal 5 (or on the display device of the tag card producing apparatus 300. This applies hereinafter.) in step S715 in FIG. 12 described above. In the example in FIG. 14A, "Projector" and "Printer (copy prohibited)" are selected (their check boxes are checked) from among a list of information of a plurality of devices for communicating with a RFID tag (with information about operation) including "Projector", "Printer", "Printer (copy prohibited)", "FAX", "Personal computer (edition unavailable)", and "Personal computer (edition available)" (refer to FIG. 14A).

FIG. 14B is a diagram showing an example of a display screen displayed on the terminal 5 (or on the display device of the tag card producing apparatus 300. This applies hereinafter.) in step S725 in FIG. 12 described above. In the example in FIG. 14B, the letters "2004 Application List" are input as the print contents.

In the above, step S615 in the flow shown in FIG. 8, which the control part 157 of the RFID circuit element To executes, constitutes the reply control part according to each claim, which executes switching control of replying to or not the file information in accordance with the predetermined identification information included in the access information to the IC circuit part received by the tag antenna, which has been transmitted from the device configured to execute the processing operation.

Step S505 in the flow in FIG. 7, which the transmitting portion 212 of the radio frequency circuit 201 and the control circuit 202 provided in the scanner part 200 of the projector 100 execute, constitutes the access unit of device for accessing information configured to generate access information to the IC circuit part, transmitting it to the RFID circuit element via the device antenna, and reading information from the IC circuit part, and step S510 in the flow in FIG. 7, which the receiving portion 213 of the radio frequency circuit 201 and the control circuit 202 execute, constitutes the receiving unit for a reply signal configured to receive the reply signals via the device antenna, the reply signal being returned from the RFID circuit element in accordance with the access information by the access unit of device for accessing information. In addition, step S515 in the flow in FIG. 7 constitutes the acquisition unit for device information configured to acquire device information from the reply signal returned by the receiving unit for a reply signal and also constituting the acquisition unit for file information configured to acquire file information based on the device information acquired by said acquisition unit for device information.

Step S550 in FIG. 7 constitutes the control unit for processing operation for executing operation control of carrying out the corresponding processing operation for the electronic file corresponding to the file information acquired by the acquisition unit for file information.

The radio frequency circuit 301 and the control circuit 302 of the tag card producing apparatus 300 constitute the generating unit for file information configured to generate file information about the electronic file to be processed, the generating unit for device information configured to generate device information about the devices capable of carrying out the processing operation for the electronic file, the generating unit for access information configured to generate access information (including tag identification information, such as Program ID etc.) to the IC circuit part, and the access unit of apparatus for accessing information configure to transmit the file information, the device information, and the access information to the RFID circuit element via the apparatus antenna and write information to the IC circuit part.

In the tag card 1 in the present embodiment, which is configured as described above, the IC circuit part 150 of the RFID circuit element To stores and holds file information (address information etc.) about the electronic file and the device information (device ID etc.). As a result, the RFID circuit element To is accessed from the device for communicating with a RFID tag, such as the projector 100 etc., and information is read from the IC circuit part 150. Then, the device acquires the device information and the file information and obtains the electronic file by accessing the information server 7 based on the acquired file information, and the device for communicating with a RFID tag automatically carries out the predetermined processing operation (projecting, printing, listing, etc.) for the obtained electronic file. As a result, it is no longer necessary to carry the electronic file in the form after processed (printed materials, etc.) and it is possible to save time and effort required to individually specify the installed electronic file for corresponding processing operation in the device after the electronic file has been installed from the RFID tag to the device for communicating with a RFID tag, as required conventionally. As a result, it is possible to improve convenience of the operator considerably.

Particularly in the present embodiment, since the IC circuit part 150 of the RFID circuit element To stores and holds identifier information (tag ID) for identifying the RFID circuit element, it is possible to efficiently access the target RFID circuit element To without radio interference by identifying the target RFID circuit element To using the tag ID even when there exists a plurality of the RFID circuit elements To in the range where communication is available from the antenna 210 of the scanner part 200.

Particularly in the present embodiment, the control part 157 of the RFID circuit element To controls switching whether or not to reply to the signal including file information in accordance with identification information (device ID) included in the signal transmitted from the device for communicating with a RFID tag (projector 100 etc.) (step S615). As a result, it is possible to improve security because the file information is replied only when the device for communicating with a RFID tag transmits the predetermined identification information, such as the device type ID, the device individual ID, etc., to the RFID circuit element To.

The present invention is not limited to the above-mentioned embodiment, and there can be various modifications without departing from the scope of its spirit and technical ideas. Variations will be described below.

(1) The Case of Transmitting Performance of Device for Communicating with a RFID Tag to Tag In the above-mentioned embodiment, as described using FIG. 8, the IC circuit part 150 of the RFID circuit element To having received the signal from the device for communicating with a RFID tag collates and determines whether or not the device ID matches with the list and switches whether or not to reply to based on only the result of collation, however, this is not limited and it may also be possible to determine based on the performance information of the device, in addition to the device ID.

In other words, in the above example, the projection control part 104 and the control circuit 202 of the projector 100 generate performance information (for example, the size of the projection screen, the distance to which projection is possible, brightness, resolution, etc.) about the processing operation of the projector and transmits it to the RFID circuit element To via the antenna 210 (the transmitting unit for performance information). The IC circuit part 150 of the RFID circuit element To determines a match with the performance information as well as determining a match between the device ID and the list and only when the determination satisfies predetermined conditions (specifications required as the processing operation of the electronic file etc., stored in advance within the IC circuit part 150), a reply is transmitted to the scanner part 200 of the projector 100.

According to the present variation, since the RFID circuit element To can recognize the processing performance of the device for communicating with a RFID tag (projector 100 etc.) and execute control of switching whether or not to reply to information in accordance with the processing performance, the combination of the electronic file relating to the RFID circuit element To and a proper device for communicating with a RFID tag as one that processes the electronic file can be optimized.

(2) The Case of Creating Link Information Icon (Shortcut Icon) on Display Device In other words, in step S515 in the flow shown in FIG. 7 described above, when address information of the electronic file relating to the RFID circuit element To is acquired at the scanner part 200 of the device for communicating with a RFID tag (projector 100 etc.), the projection control part 104 and the control circuit 202 (the a generating unit for pictogram display signal) output a pictogram display signal to the display device (not shown. The display device of the terminal 5 may also be accepted. This applies hereinafter.) of the projector 100 and may cause the display device to generate and display a pictogram for operation (a so-called link information icon or shortcut icon). When the operator operates (clicks) an icon on the display device of the device for communicating with a RFID tag (or the terminal 5), such as the projector 100 etc., the information server 7 is accessed and the corresponding electronic file (or information about this) is displayed on the display device, and therefore, it is possible to further improve the convenience of the operator.

(3) The Case of Providing Shortcut File in Route Server

In the above-mentioned embodiment, the IC circuit part 150 of the RFID circuit element To in the tag card 1 directly stores address information of the electronic file, however, this is not limited. In other words, it may also be possible to store and hold the storage address (address information) of each electronic file within the information server 7 separately in the router server 4 (address-management server) as shown by the alternate long and two short dashes line in FIG. 5.

FIG. 15 is a flow chart showing a control procedure executed by the projection control part 104 and the control circuit 202 provided in the projector 100 in the variation, corresponding to FIG. 7 described above.

In FIG. 15, as in FIG. 7, after a reading signal (link-information file access information, to be described in detail later) is output via the radio frequency circuit 201 and the antenna 210 in step S505, it is determined in step S510 whether or not the reply signal transmitted (returned) from the RFID circuit element To has been taken into the control circuit 202 via the radio frequency circuit 201. When the determination is satisfied, the operation goes to step S515' provided in place of step S515.

Although not shown in detail, in this variation, the IC circuit part 150 of the RFID circuit element To does not directly store the address on the information server 7 of the electronic file, as described above, as file information in the data structure shown in FIGS. 9A to 9E, but stores the address (indirect address information, intermediate address information) of the route server 4 in which the address on the information server 7 is stored. In the address of the route server 4, address information (link-information file) to the information server 7 (file storage server, contents server) is generated, in which the electronic file is stored. In step S515', in accordance with this, the address of the link-information file of the corresponding route server 4 and the device information are read and acquired from the reply signal received from the RFID circuit element To.

After that, the operation goes to step S520 and as formerly, it is determined whether or not the device information acquired in step S515' matches with the projector 100. When it matches, the determination is satisfied and the operation goes to step S527, newly provided.

In step S527, based on the address of the link-information file in the route server 4 acquired in step S515', an inquiry signal is output to the route server 4 via the communication line 3.

After that, in step S528, newly provided, in accordance with the inquiry signal in step S528, the address (address on the information server 7 in which the electronic file is stored) of the electronic file returned from the link-information file of the route server 7 is obtained.

The procedure after step S530 is the same as that in FIG. 7 and therefore its explanation is omitted.

In the present variation, when, for example, the tag card 1 is manufactured in the tag card producing apparatus 300, the link-information file to the information server 7, which is the file storage server, is created in the route server 4 and at the same time, information (address on the route server 4) to access the link-information file on the route server 4 is written to the IC circuit part 150. For the tag card 1, the device for communicating with a RFID tag (projector 100 etc.) reads information, acquires the address on the route server 4 to access the link-information file on the route server 4, and acquires the address of the electronic file on the information server 7 to access the address of the information server 7, and thereby acquires the electronic file to be processed (projected, printed, edited, etc.).

Here, if the electronic file is moved to another address in the information server 7 (or an address in a database in another storage apparatus outside the information server 7 etc.) for some reason on the part of the operator, the address identifier (CMA) generally provided to the electronic file is updated (automatically) due to the movement, and therefore, accompanying this, the address described in the corresponding link-information file in the route server 4 is updated (automatically) to a new address. As a result, it is possible to maintain the access to the electronic file using the RFID circuit element To without fail by establishing the above-mentioned flow, that is, the RFID circuit element To→the link-information file of the route server 4→the information server 7 (an information acquisition form in which another server is interposed in between) even if the electronic file is moved as described above.

Similar to the above, in which the address on the information server 7 of the electronic file is not stored directly as file information but the address (indirect address information, intermediate address information) of the route server 4 in which the address on the information server 7 is stored, it may also be possible to store the device information (device type ID, device individual ID, etc.) and the operation information in another server (intermediate server) and store the storage address in the intermediate server in the IC circuit part 150 of the RFID circuit element To.

(4) Others

In the above, when the device ID of the device for communicating with a RFID tag (projector 100 etc.) or the performance possessed thereby etc. is not compatible with the electronic file relating to the RFID circuit element To, the RFID circuit element To ignores the inquiry signal from the device and does not reply in particular (refer to step S615 in FIG. 8 etc.), however, this is not limited, and in such a case, it may also be possible for the RFID circuit element To to return a signal to the effect that the inquiry cannot be answered (reading-not-possible reply signal).

Further, in the above, an example is described, in which the RFID circuit element To stores and holds identifier information (tag ID) also in addition to file information and device information, however, it is not necessarily required to store identifier information in the case where radio interference due to a plurality of the RFID circuit elements To is unlikely to occur (or where there is no need to take radio interference into consideration), such as when the RFID circuit element To is used in the circumstances in which only one tag can be read actually in short-distance communication. In this case also, it is possible to obtain the original effects of the present invention that the need for the operator to carry documents can be obviated, time and effort to instruct operations after the installation of the electronic file can be saved, and the convenience can be improved considerably.

Furthermore, it may also be possible to properly combine the techniques in the above-mentioned embodiment and the variations (1) to (4). In these cases also, it is possible to obtain the total effect combined by those of the combined embodiment or variations and to obtain the original effects of the present invention that the convenience of the operator can be improved considerably, as in the above.

Although not described individually, it is possible to implement the present invention by applying various modifications thereto within the scope not departing from its spirit.

What is claimed is:

1. An information processing system comprising:
   an information server configured to store at least an electronic file;
   a device connected to said server and capable of transmitting/receiving information to said server;
   an RFID tag configured to store electronic file address information indicating a place where said electronic file is stored and device information related to said device; and
   said device configured to be capable of practicing radio communication with said RFID tag, wherein:
   said device comprises:
   a read signal transmission portion configured to transmit a read signal including first device identification information with respect to the device, and
   said RFID tag comprises:
   a first reception portion configured to receive said read signal transmitted from said read signal transmission portion;
   a first information acquisition portion configured to acquire said first device identification information included in said read signal received by said first reception portion;
   a first determination portion configured to determine whether or not said first device identification information acquired by said first information acquisition portion corresponds to device identification information to reply; and
   a reply signal transmission portion configured to transmit a reply signal including said electronic file address information stored and said device information stored to said device when said first determination portion determines that said first device identification information corresponds to device identification information to reply, and
   said device further comprises:
   a second reception portion configured to receive said reply signal transmitted from said reply signal transmission portion;
   a second information acquisition portion configured to acquire said electronic file address information and said device information included in said reply signal received by said second reception portion; and
   a signal output portion configured to output an inquiry signal to said information server based on said electronic file address information acquired by said second information acquisition portion, and
   said server further comprises:
   a data output portion configured to output an electronic file data stored in an address indicated by said electronic file address information to said device on the basis of said inquiry signal outputted from said signal output portion, and
   said device further comprises:
   a data acquisition portion configured to acquire said electronic file data outputted from said data output portion;
   an application acquisition portion configured to acquire an application corresponding to said electronic file data;
   an application start portion configured to start said application acquired by said application acquisition portion;
   a file read process portion configured to read a content of said electronic file with respect to said electronic file data acquired by data acquisition portion by means of using said application started by said application start portion; and
   an operation process portion configured to practice a predetermined process operation peculiar to the device in accordance with said content of said electronic file read by said file read process portion.

2. The information processing system according to claim 1, wherein:
   said RFID tag further comprises:
   a storage portion configured to store second device identification information with respect to at least one device capable of practicing a process operation of said electronic file where the electronic file address information of the electronic file is stored in the storage portion, and
   said first determination portion practices the determination according to whether or not said first device identification information acquired by said first information acquisition portion corresponds or partly corresponds to any of said second device identification information stored in said storage portion.

3. The information processing system according to claim 1, wherein:
   said device further comprises:
   a second determination portion configured to determine an adaptability of said device information acquired by said second information acquisition portion with respect to said first device identification information related to the device, or a spec of the device, or performance of the device, and
   said signal output portion outputs said inquiry signal to said information server when the determination by said second determination portion is satisfied.

* * * * *